United States Patent
Prabhakar et al.

(10) Patent No.: US 12,341,769 B2
(45) Date of Patent: Jun. 24, 2025

(54) AUTOMATIC GENERATION OF NETWORK ACCESS POLICIES

(71) Applicant: Arista Networks, Inc., Santa Clara, CA (US)

(72) Inventors: Krishna Prabhakar, Los Altos Hills, CA (US); Rajarao Bhagya Prasad Nittur, Milpitas, CA (US); Anoop Kumaran Nair, Thrikkakara (IN); Rajesh Kumar Ganapathy Achari, Perumbavoor (IN); Madhusudhan Chitradurga Sethuram Setty, Bengaluru (IN); Venkatesh Ramachandran, Bengaluru (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/397,939

(22) Filed: Dec. 27, 2023

(65) Prior Publication Data

US 2024/0414058 A1 Dec. 12, 2024

(30) Foreign Application Priority Data

Jun. 12, 2023 (IN) .............................. 202341039926

(51) Int. Cl.
*G06F 15/173* (2006.01)
*G06F 11/07* (2006.01)
(Continued)

(52) U.S. Cl.
CPC ........ *H04L 63/083* (2013.01); *G06F 11/0709* (2013.01); *G06F 11/079* (2013.01);
(Continued)

(58) Field of Classification Search
CPC .............. H04L 63/083; H04L 63/0823; H04L 63/0876; H04L 63/10; H04L 63/102; H04L 41/149; H04L 41/0895; H04L 41/0894; H04L 41/0806; H04L 41/0893; H04L 41/145; H04L 41/28; H04L 9/0825; H04L 43/0876; G06F 16/242; G06F 16/245; G06F 40/40; G06F 40/295; G06F 11/0709; G06F 11/079; G06F 11/0793; G06F 11/2257; G06N 5/022
See application file for complete search history.

(56) References Cited

U.S. PATENT DOCUMENTS

7,437,755 B2 10/2008 Farino et al.
7,592,906 B1 9/2009 Hanna et al.
(Continued)

*Primary Examiner* — Joseph R Maniwang
(74) *Attorney, Agent, or Firm* — Treyz Law Group, P.C.; Jason Tsai (57) ABSTRACT

A method of operating a network is provided that includes identifying a plurality of client devices connected to the network, categorizing the client devices into respective client groups based on device characteristics of each of the client devices, analyzing traffic patterns among the client groups and assigning the client groups to respective network segments based on the observed traffic patterns, and generating one or more network access policy for at least one of the network segments based on the traffic patterns or baseline behavior associated with a portion of the client devices belonging to the at least one of the network segments.

20 Claims, 6 Drawing Sheets

(51) Int. Cl.
| | |
|---|---|
| *G06F 11/22* | (2006.01) |
| *G06F 16/242* | (2019.01) |
| *G06F 16/245* | (2019.01) |
| *G06F 40/295* | (2020.01) |
| *G06F 40/40* | (2020.01) |
| *G06N 5/022* | (2023.01) |
| *H04L 9/08* | (2006.01) |
| *H04L 9/40* | (2022.01) |
| *H04L 41/0806* | (2022.01) |
| *H04L 41/0893* | (2022.01) |
| *H04L 41/0894* | (2022.01) |
| *H04L 41/0895* | (2022.01) |
| *H04L 41/14* | (2022.01) |
| *H04L 41/149* | (2022.01) |
| *H04L 41/28* | (2022.01) |
| *H04L 43/0876* | (2022.01) |

(52) U.S. Cl.
CPC ...... *G06F 11/0793* (2013.01); *G06F 11/2257* (2013.01); *G06F 16/242* (2019.01); *G06F 16/245* (2019.01); *G06F 40/295* (2020.01); *G06F 40/40* (2020.01); *G06N 5/022* (2013.01); *H04L 9/0825* (2013.01); *H04L 41/0806* (2013.01); *H04L 41/0893* (2013.01); *H04L 41/0894* (2022.05); *H04L 41/0895* (2022.05); *H04L 41/145* (2013.01); *H04L 41/149* (2022.05); *H04L 41/28* (2013.01); *H04L 43/0876* (2013.01); *H04L 63/0823* (2013.01); *H04L 63/0876* (2013.01); *H04L 63/10* (2013.01); *H04L 63/102* (2013.01)

(56) References Cited

U.S. PATENT DOCUMENTS 8,925,036 B2  12/2014  Pramod
2023/0053883 A1* 2/2023  O'Connell ......... H04L 43/0823

* cited by examiner

AUTOMATIC GENERATION OF NETWORK ACCESS POLICIES

This application claims the benefit of Indian Provisional Patent Application No. 20/234,1039926, filed Jun. 12, 2023, which is hereby incorporated by reference herein in its entirety.

BACKGROUND

A network can include many different types of devices. The various types of devices in the network can be divided into different device groups. For example, a network can include cameras, thermostats, smoke detectors, medical or health sensors, lighting fixtures, voice-controlled speakers, printers or other output devices, controllers or other input devices, cars, wearable devices, and/or other network-connected equipment. It can be challenging to manage network access control policies for a network with many different types of devices.

DETAILED DESCRIPTION

A method of operating a network is provided that includes identifying a plurality of client devices that are connected to the network, categorizing the identified client devices into different client groups based on device characteristics of each of the client devices, analyzing traffic patterns among the client groups and assigning the client groups to different network segments based on the observed traffic patterns, and generating one or more network access policy for at least one of the network segments based on the traffic patterns and/or baseline behavior associated with a portion of the client devices belonging to the at least one of the network segments.

The method can further include operating the network in a monitoring mode using the generated network access policy. During the monitoring mode, traffic violations can be detected by checking whether the portion of the client devices belonging to the at least one of the network segments is violating the generated network access policy. The network access policy can optionally be modified. The method can further include operating the network in an enforcement mode when no traffic violations have been detected for some extended period of time. During the enforcement mode, traffic violations can be detected by checking whether the portion of the client devices belonging to the at least one of the network segments is violating the modified network access policy. Client devices that violates a network access policy during the enforcement mode can be moved to a quarantine segment to prevent that client device from interacting with other client devices.

Figure 1:
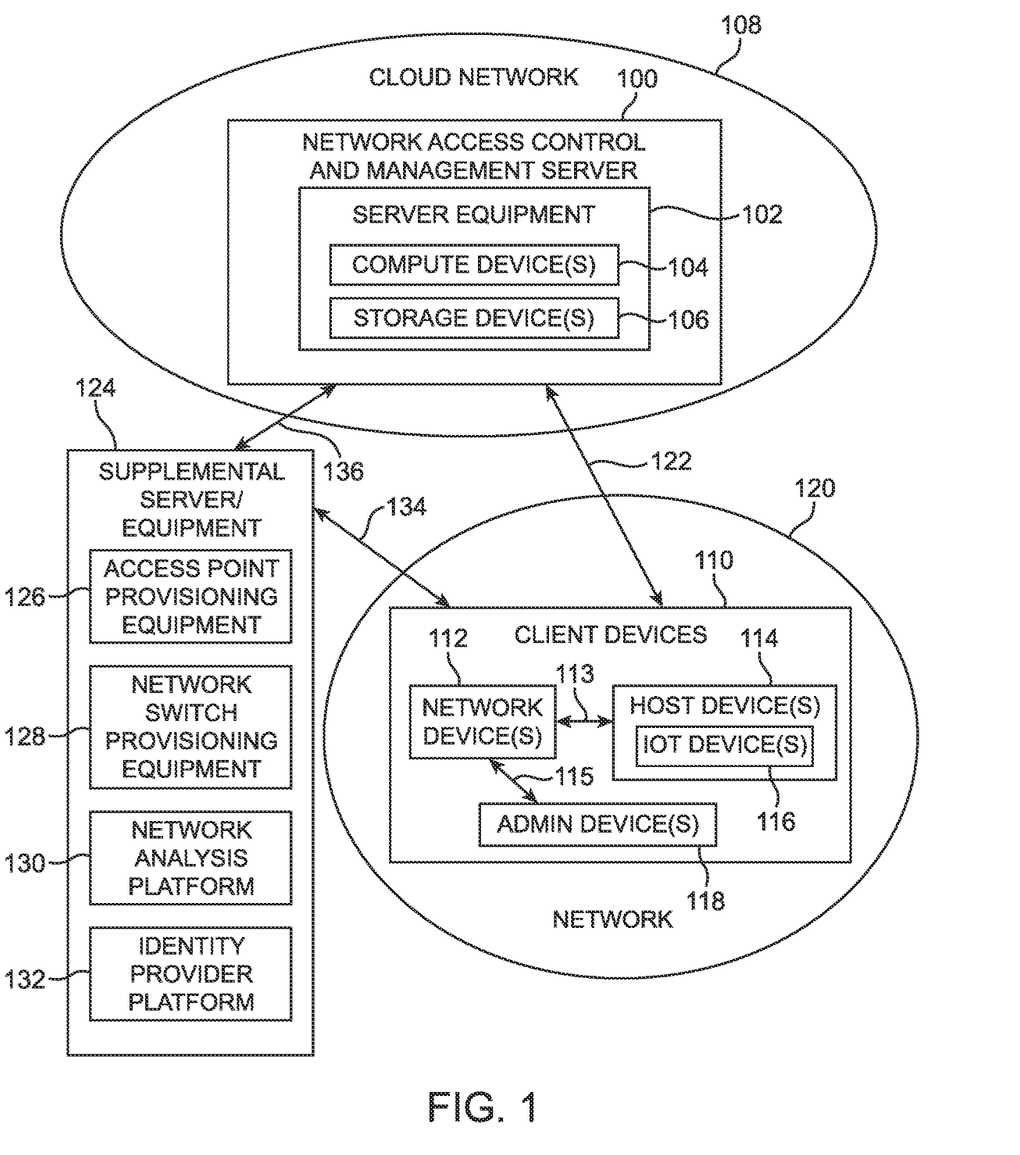
FIG. 1 is a diagram of an illustrative system managing network access control in accordance with some embodiments.

FIG. 1 shows an illustrative networking system that includes a server such as network access control and management server 100. Network access control and management server 100 may be formed from server equipment 102 containing any suitable number of compute devices 104 and any suitable number of storage devices 106.

As an example, server equipment 102 may include server hardware such as blade servers, rack servers, tower servers, micro servers, graphics processing unit (GPU) servers, data storage servers, and enterprise servers. Configurations in which server equipment 102 includes rack servers mounted to racks of a server chassis or enclosure are sometimes described herein as an illustrative example. Each of compute devices 104 and/or storage devices 106 may be provided as part of the server hardware (e.g., as part of rack servers).

Compute devices 104 may include one or more processors or processing units based on central processing units (CPUs), graphics processing units (GPUs), microprocessors, general-purpose processors, host processors, microcontrollers, digital signal processors (DSPs), programmable logic devices such as a field programmable gate array devices (FPGAs), application specific system processors (ASSPs), application specific integrated circuits (ASICs), and/or other types of processors. Storage devices 106 may include non-volatile memory (e.g., flash memory or other electrically-programmable read-only memory configured to form a solid-state drive), volatile memory (e.g., static or dynamic random-access memory), hard disk drive storage, solid-state storage, and/or other storage circuitry. More specifically, storage devices 106 may include non-transitory (tangible) computer readable storage media configured to store the operating system software and/or any other software code, sometimes referred to as program instructions, software, data, instructions, or code. Compute devices 104 may run (e.g., execute) an operating system and/or other software/firmware that is stored on storage devices 106 to perform desired operations of server 100. In such a manner, server equipment 102 may implement one or more services, one or more software servers, and/or other software features to collectively perform the functions of network access control and/or network management for server 100. As described herein, server 100 can refer to the underlying server (hardware) equipment and/or the server software (e.g., services) executed thereon to perform the operations of server 100.

Network access control and management server 100 may be configured to provide network policy reception, definition, monitoring, and enforcement (e.g., reception, definition, and enforcement of network access policy and/or security policy via virtual local area networks (VLANs), access control lists (ACLs), vendor-specific attributes (VSAs), and/or other policy-defining features), natural language query, processing, and response (e.g., a chat interface for outputting network information and network configuration assistance and recommendation based on user natural language input), network-connected device profiling (e.g., the gathering, storage, and analysis of network-connected device information to facilitate network policy recommendations and/or other network configuration recommendations), predictive failure event handling (e.g., prediction and handling of future expected (yet-to-occur) failure events associated with server infrastructure and/or network configuration), network authentication (e.g., authentication for user and/or user device(s) connected to the network), public key infrastructure (PKI) (e.g., includes a certificate authority, a certificate issuance service, a certification validation and/or status lookup service, a certificate database, etc.), interfacing and integration services with external applications and/or servers (e.g., obtain network and/or user information from and distribute network and/or user information to external equipment), and device and/or user onboarding (e.g., registration and storage of user and/or user device information), as just a few examples. In general, server 100 may perform any suitable functions for network access control and management.

Server 100 may be implemented as a part of a cloud network such as cloud network 108. Cloud network 108 may include one or more network devices such as switches (e.g., multi-layer switches), routers, gateways, bridges, hubs, repeaters, firewalls, wireless access points, devices serving other networking functions, devices that includes a combination of these functions, or other types of network devices. Multiple such network devices (e.g., network devices of different types or having different functions) may be present in cloud network 108 and interconnected therebetween and with other network devices to form a cloud network that forwards traffic to and from portions (e.g., different parts of server equipment 102) of server 100 serving as end hosts of cloud network 108. Configurations in which server 100 is implemented on public cloud infrastructure (e.g., cloud network 108 is a public cloud network) are sometimes described herein as an illustrative example. If desired, server 100 may be implemented on a private cloud network or an on-premise network.

Network access control and management server 100 may communicate with client devices 110 such as one or more network device(s) 112, one or more host device(s) 114, and network administrator devices 118, which are used to configure and administer other network devices. Host devices 114 can include Internet-of-Things (IoT) devices 116 such as network-connected appliances or device such as network-connected cameras, thermostats, smoke detectors, medical or health sensors which are sometimes referred to as Internet-of-Medical-Things (IOMT) devices, or other sensors, lighting fixtures, voice-controlled speakers, printers, or other output devices, controllers or other input devices, cars, wearable devices, and other network-connected equipment that serve as input-output devices and/or computing devices in the distributed networking system. In some illustrative arrangements described herein as an illustrative example, communication between server 100 and at least some host devices 114 (e.g., IoT devices 116) may occur via network devices 112 and links 113 (e.g., network devices 112 may forward network traffic between server 100 and host devices 114 to facilitate communication therebetween). Client devices 110 may form part of network 120 for which server 100 provides the above-mentioned functions (e.g., network access control and management functions containing any combination of network policy handling, natural language query handling, network-connected device profiling, predictive failure event handling, network authentication, public key infrastructure (PKI) services, interfacing and integration services with external applications and/or servers, device and/or user onboarding, etc.).

Host devices 114 may serve as end hosts of network 120 connected to each other and/or connected to other end hosts of other networks (e.g., server 100 of cloud network 108) via network devices 112 using communication paths 113. User devices such as administrator devices 118 may perform network administration for network devices 112, while other user devices may serve as end host devices 114. Network devices 112 may include switches (e.g., multi-layer switches), routers, gateways, bridges, hubs, repeaters, firewalls, access points, modems, load balancers, devices serving other networking functions, devices that include a combination of these functions, or other types of network devices.

Network access control and management server 100 may provide network access control and network management services for network 120 by communicating with network devices 112 and/or host devices 114 via communication paths 122. To facilitate network access control and network management, server 100 may communicate with other supplement servers and/or equipment 124. These supplemental servers 124 may include network management and network device management equipment such as wireless access point provisioning (and/or management) equipment 126 (e.g., a wireless access point management server), network switch provisioning (and/or management) equipment 128 (e.g., a network switch management server), and/or other network device management equipment that communicate with network devices 112 (e.g., to supply provisioning and/or configuration data, to receive network performance metrics data, and/or to exchange other suitable information).

Supplemental servers and equipment 124 may include one or more network analysis platforms 130 such as servers and/or services that provide analysis of network performance by way of providing endpoint visibility and security analysis (e.g., based on network traffic to and/or from host devices 114). Supplemental servers and equipment 124 may further include platforms that provide additional contextual information for the network, the users on the network, and/or the devices on the network such as identity provider platform 132 (e.g., servers and/or services that provide user identity authentication, a single sign-on (SSO) provider platform). In particular, supplemental server and/or equipment 124 may communicate with components of network 120 (e.g., network devices 112 and host devices 114) to supply provisioning, configuration, and/or control data, to receive network, device, and/or user information, and/or to otherwise exchange information therebetween via communications paths 134. Supplemental server and/or equipment 124 may communicate with server 100 (e.g., different portions of server equipment 102) to transmit the received network, device, and/or user information, to receive network access control and/or management information, and/or to otherwise exchange information therebetween via communications paths 136.

Configurations in which equipment 126 and 128 and other network device management equipment refer to server equipment (e.g., similar to server equipment 102) on which network device provisioning and/or management software are executed are sometimes referred to herein as an illustrative example. Similarly, configurations in which network analysis platform 130 and identify provider platform 132 are cloud-based platforms (e.g., applications executed on server equipment) are sometimes described herein as an illustrative example. In these examples, servers and/or equipment 124 may be implemented within the same cloud network as or different cloud networks than server 100. If desired, any of supplement servers and/or equipment 124 may be implemented locally (e.g., local to network 120) instead of as a cloud application (e.g., implemented on a cloud server) or may be implemented in other desired manners.

The networking system in FIG. 1 (e.g., the combination of cloud network 108, network 120, and equipment 124) may span any suitable scope depending on the implementations of servers 100 and 124. Communication paths 122, 134, and 136 may be implemented according to the scope of the networking system. Configurations in which one or more of communication paths 122, 134, and 136 include the Internet are sometimes described herein as an illustrative example. In particular, any of communications paths 122, 134, and 136 may use Hypertext Transfer Protocol Secure (HTTPS), Remote Authentication Dial-In User Service (RADIUS) with Transport Layer Security (TLS) encryption (e.g., RadSec), Secure Shell (SSH), Internet Protocol Security (IPSec), Secure File Transfer Protocol (SFTP), or other secure protocols for establishing and communicating using the corresponding communications paths.

Figure 2:
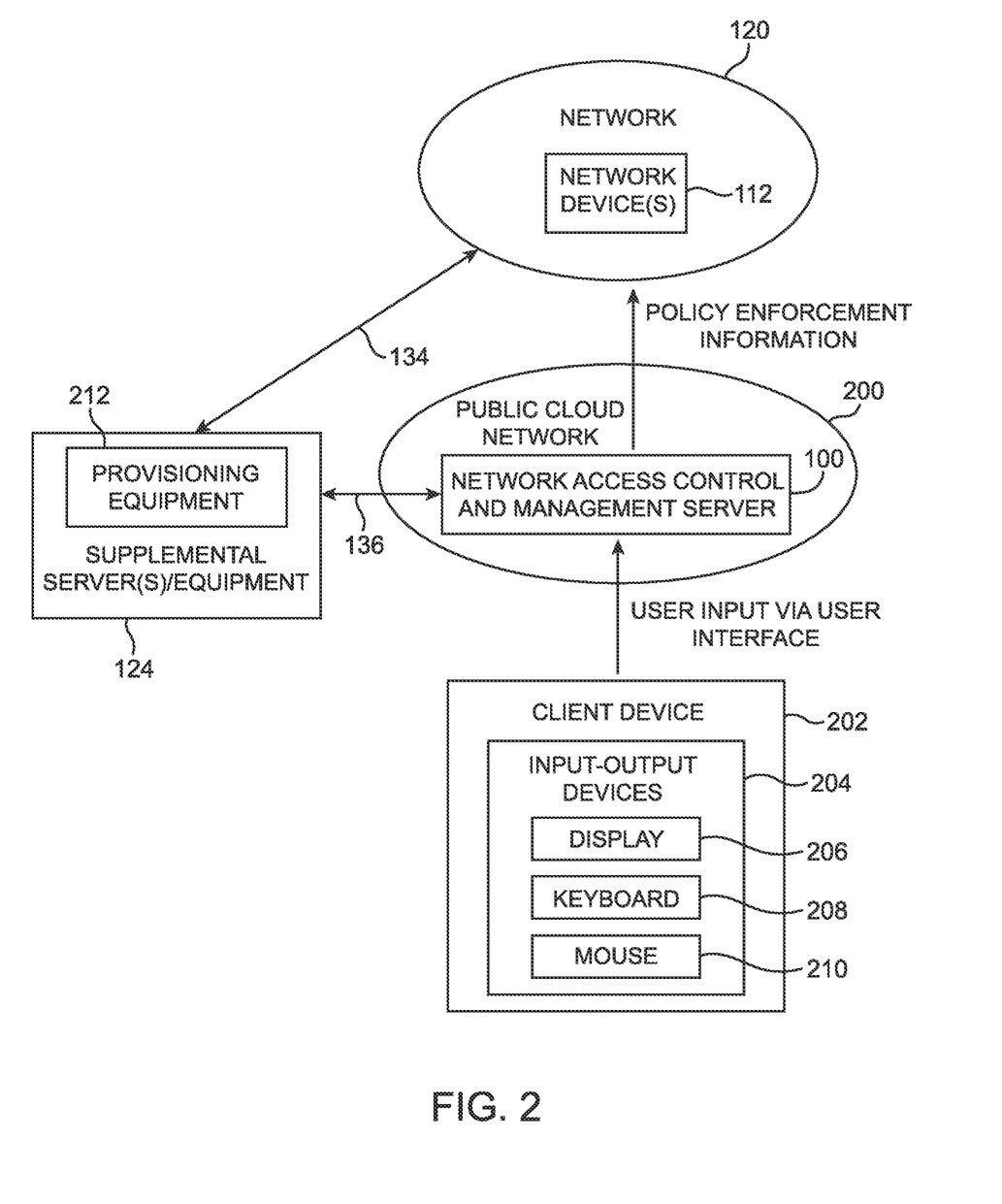
FIG. 2 is a diagram of an illustrative network access control and management server configured to define network access policies in accordance with some embodiments.

FIG. 2 is a diagram of an illustrative network access control and management server 100 configured to receive network policy information and to apply or enforce the received network policy. In the example of FIG. 2, network access control and management server 100 may be implemented as part of a cloud network such as public cloud network 200.

A client device such as client device 202 (e.g., a host device 114, admin device 118, user device, or other types of client devices of network 120 in FIG. 1) may be configured to communicate with server 100 via a user interface. As examples, client device 202 may be a computing device such as a desktop, a portable computing device (e.g., a laptop, a cellular telephone, etc.), or other computing device configured to receive user input and convey the received user input to server 100. If desired, client device 202 may be an IoT device such as IoT device 116 in FIG. 1. The computing functions of device 202 may be provided by processing circuitry (e.g., one or more of central processing units (CPUs), graphics processing units (GPUs), microprocessors, general-purpose processors, host processors, microcontrollers, digital signal processors, programmable logic devices, and other types of processor circuitry) and memory circuitry (e.g., one or more of non-volatile memory, volatile memory, hard disk drive storage, solid-state storage, and other types of storage circuitry) on device 202. In particular, the memory circuitry may include non-transitory (tangible) computer readable storage media that stores the operating system software and/or any other software code, which when executed by the processing circuitry, performs desired operations of client device 202 such as providing a user input-output interface (e.g., running a web browser application on which a graphical user interface is provided).

In one illustrative arrangement, client device 202 may include input-output devices 204 such as display 206, keyboard 208, and mouse 210, as just a few examples of user interfaces. Display 206 may present a user with an output (e.g., to display a web browser application with a graphical user interface), and the user may interact with such interface using keyboard 208 and mouse 210 (e.g., the user can supply an input to the web browser application via the graphical user interface).

The user input can include desired network policy information such as network access policies. Based on the user input conveying network policy information, server 100 may send corresponding policy enforcement information to apply the network access policy to network 120. As an example, the policy information may be in the form of configuration data conveyed to network devices 112 and/or may be in the form of user identity and authentication data conveyed to network devices 112. In one illustrative arrangement, some of all of the network devices 122 may be controlled and configured by network device provisioning (and/or management) equipment 212 (e.g., one or more network device management servers such as access point provisioning equipment 126 and network switch provisioning equipment 128 in FIG. 1). Accordingly, server 100 may communicate with these supplemental servers 124 (e.g., provisioning server equipment 212) to supply the policy enforcement information to network devices 112 (e.g., using communication paths 136 and 134). The workflow of supplying network policy information is typically tedious and prone to error as the user needs to supply numerous inputs in an unstructured manner. To simplify the input of policy information, server 100 may provide a user interface to user device 202 to simplify and organize the input of the network policy information.

Figure 3:
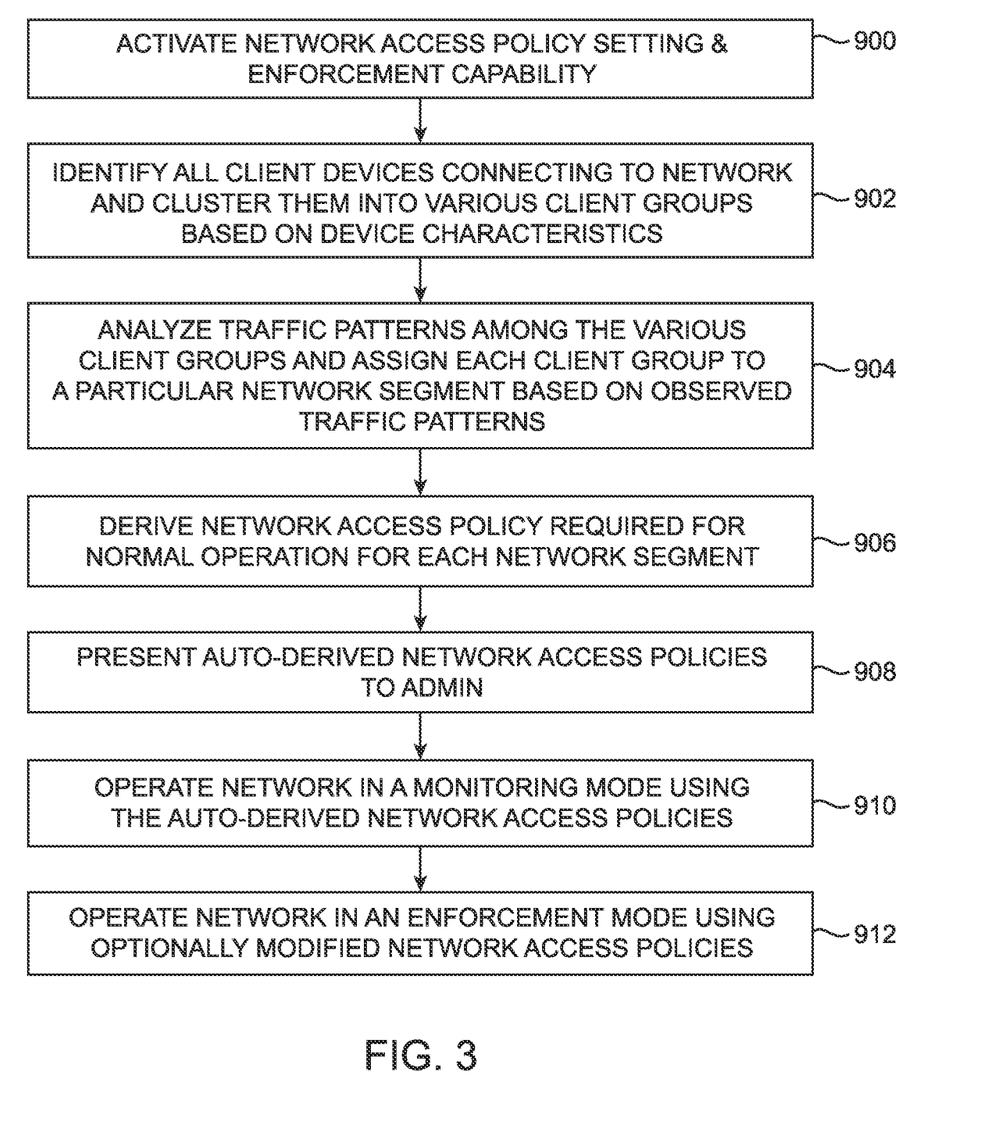
FIG. 3 is a flow chart of illustrative steps for automatically deriving network access policies between different network segments in accordance with some embodiments.

The example above in which the networking system relies on the user to provide network policy information such as network access policies can be prone to human error. In an effort to reduce the probability of human error, network access control and management server 100 can be configured to automatically derive network access policies based on baseline or expected behavior of the client devices being managed. FIG. 3 is a flow chart of illustrative steps for operating network access control and management server 100 to derive network access policies for one or more network segments. A "network access policy" (sometimes referred to as network access control policy) can refer to and be defined herein as a set of rules and guidelines that dictate how client devices can connect to and interact with one another in a computer network. Network access policies lay out the permissions, restrictions, and protocols governing network access and usage to ensure security, integrity, and availability of computing resources. For example, network access policies can include policies relating to how devices must authenticate their identities to gain access to the network, access control lists or ACLs (e.g., lists of rules indicating which files, folders, or resources are accessible to specific users or groups), network segmentation to ensure isolation from different network segments to help increase the overall security, encryption requirements, firewall rules, remote access requirements, policies that govern the types of devices allowed to connect to a certain part of the network, guidelines for keeping the devices up to date with the latest security patches or updates, policies for monitoring network activities and events for potential breaches, and/or other rules and policies.

A "network segment" can refer to a portion of a computer network that is logically or physically separated from other parts of the network. Physical segmentation can be implemented using separate dedicated hardware for each network segment. Logical segmentation can be implemented using virtual local area networks (VLANs), which allow different devices to be grouped together virtually regardless of their physical location. Subnetting, which divides an IP address range into smaller sub-ranges and allows devices within the same subnet to communicate directly with each other without a router, can also be used to implement network segmentation. Network segmentation can be employed to improve network performance, security, isolation of critical assets, compliance, and manageability by organizing a large and often complex network into smaller, more manageable segments. Each network segment can operate independently to some extent with its own set of rules and policies governing access and communication. Thus, a network segment can be defined herein as a group of client devices that are or should be assigned the same or similar network access policy.

During the operations of block 900, a user or administrator of a network such as network 120 of FIGS. 1 and 2 can activate a network access policy setting and enforcement capability provided by network access control and management server 100. Activating such network access policy setting and enforcement capability or feature of server 100 enables server 100 to automatically derive/generate network access policies, to monitor client devices within one or more network segments to determine whether the client devices are violating the network access policies, to ensure that the client devices are abiding by the auto-generated network access policies, etc.

During the operations of block 902, server 100 can identify all client devices that are connecting to a network and cluster the identified client devices into various client groups (or clusters) based on the device characteristics of each client device. In some embodiments, server 100 can employ machine learning based classification algorithms to classify or cluster clients with similar device characteristics into the same client group. Device characteristics or features that might be used to categorize clients into different groups can include the device's assigned name or hostname, media access control (MAC) address, Internet Protocol (IP) address, operating system, open ports, manufacturer information, and/or physical location, just to name a few. For example, security cameras made by a first manufacturer can be classified as a first camera group based on similar device characteristics/features, whereas security cameras made by a second manufacturer might be classified as a second camera group based on similar device characteristics/features. As another example, digital video recorders (DVRs) made by the first manufacturer can be classified as a first DVR group based on similar device characteristics/features, whereas DVRs made by the second manufacturer might be classified as a second DVR group based on similar device characteristics/features.

During the operations of block 904, server 100 can analyze traffic or behavioral patterns among the various client (device) groups and assign each client group to a particular network segment based on the observed traffic and behavioral patterns. For example, server 100 can analyze the type and volume of network traffic generated by a client group to gain insight into its role within the network, how the client group interacts or behaves with other devices within the network, the protocol the client group uses to communicate with other devices, domain name system (DNS) queries made by the client group, the speed (latency) at which the client group responds to network requests, and/or the resource usage (e.g., by monitoring CPU or memory usage) of the client group, just to name a few. Continuing with the example from above, the first camera group associated with the first manufacturer and the second camera group associated with the second manufacturer can be assigned to the same network segment (e.g., a camera segment) based on the observed traffic and behavioral patterns of the two camera groups, whereas the first DVR group associated with the first manufacturer and the second DVR group associated with the second manufacturer can be assigned to the same network segment (e.g., a DVR segment) based on the observed traffic and behavioral patterns of the two DVR groups.

During the operations of block 906, server 100 can automatically derive or generate a network access policy configured to ensure normal operation for each network segment or between each pair of network segments. The network access policies generated by server 100 can be automatically inferred from the baseline or expected behavior observed during block 904. Continuing again with the example from above, server 100 might generate a network access policy specifying that the camera segment including security cameras from the first and second manufacturers only communicate with the DVR segment including DVRs from the first and second manufacturers (e.g., assuming that this behavior aligns with the traffic patterns observed during block 904). Different network segments can have different network access policies. If desired, different groups of client devices within the same network segment can optionally be assigned different network access policies. For example, a group of basic (low definition) security cameras may operate in accordance with a first network access policy, whereas a group of high definition security cameras may operate in accordance with a second network access policy that limits the bandwidth of the high definition security cameras since they transfer more bytes of data compared to the low definition cameras.

During the operations of block 908, the auto-derived network access policy for each network segment or policies for a plurality of network segments may optionally be presented to the user or administrator (admin) of the network. The user/admin may be presented with the opportunity to update or otherwise modify the network access policies. In some scenarios, the network access policies generated by the operations of block 906 can be overly strict or stringent, resulting in overly frequent violations of the network access policies. In such instances, the user/admin can adjust the network access policies to loosen the requirements to reduce the frequency of policy violations. This is merely illustrative. If desired, the user/admin can alternatively tighten the requirements by making the network access policies even more stringent.

During the operations of block 910, the network can be operated in a monitoring mode using the network access policy or policies derived from block 906. As described above in connection with block 908, the user can take this opportunity during the monitoring mode to fine tune the auto-generated network access policies. Although block 910 is shown as occurring after block 908 in FIG. 3, the operations of block 908 and 910 can occur simultaneously (in parallel) or the operations of block 908 can occur after block 910.

During the operations of block 912, the network can be operated in an enforcement mode using the optionally modified network access policies. If the network access policies have not been modified at block 908 or 910, the network can operate in accordance with the auto-generated network access policies derived from block 906 during the enforcement mode. During the enforcement mode, the network access policies are strictly enforced by the network such that the client devices within the network are restricted from violating any established network access policies.

Figure 4:
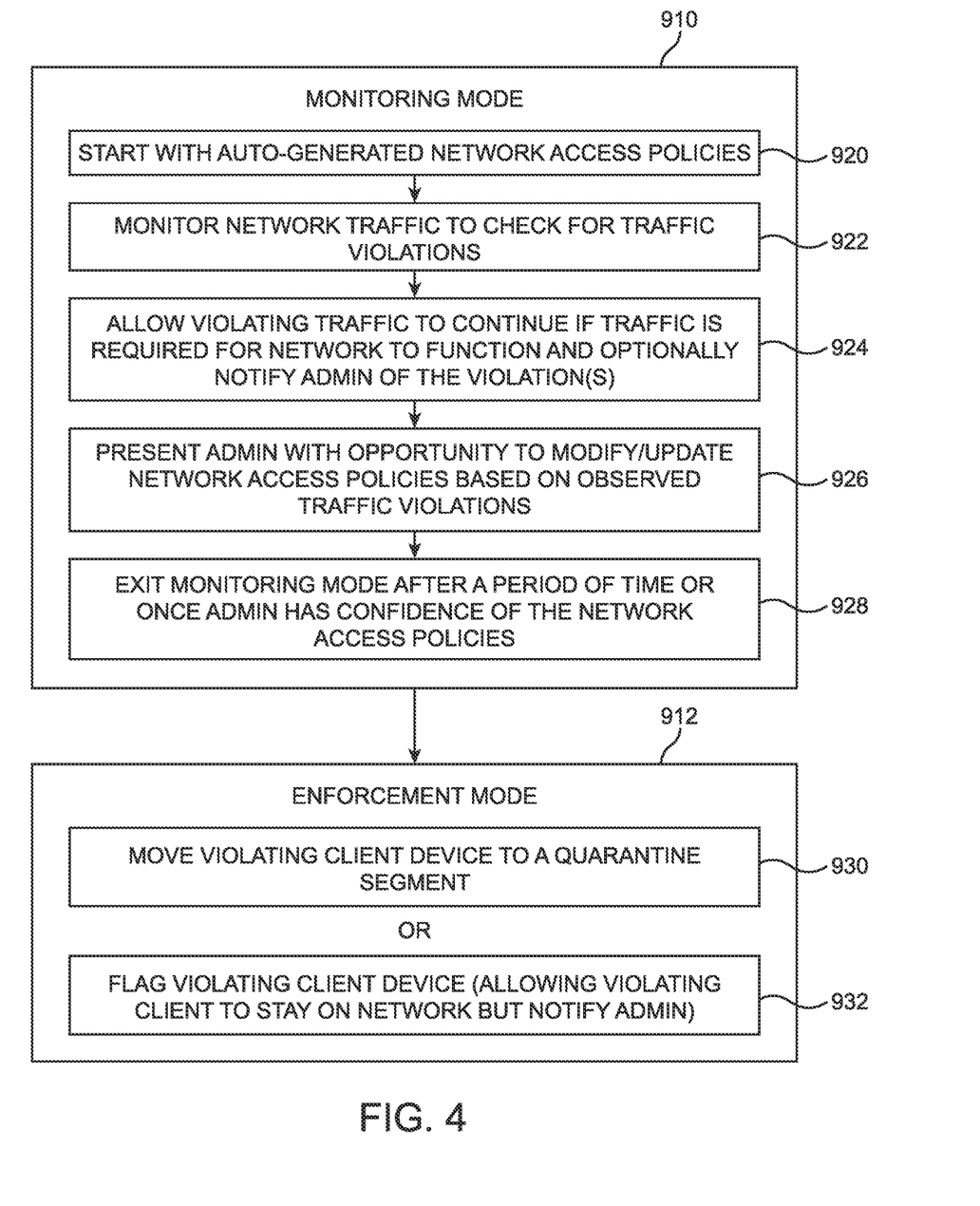
FIG. 4 is a flow chart of illustrative steps for operating a network in a monitoring mode and an enforcement mode in accordance with some embodiments.

Additional details of the monitoring mode and enforcement mode are shown in FIG. 4. Block 910 includes operations that can be performed during the monitoring mode. At step 920, a network can begin operating using the auto-derived network access policies obtained from block 906. At step 922, server 100 can monitor the network traffic or behavior of one or more client devices within the network to determine (check) whether the client devices are violating any of the network access policies. At step 924, server 100 can optionally allow any violating traffic to proceed if such traffic is required for the network to function correctly. As examples, traffic associated with the management of network routing/forwarding tables, traffic associated with the mapping of IP addresses to MAC address, traffic relating to the status or updating of network paths, and/or traffic relating to the authentication or access of network resources can optionally be allowed to continue even if such traffic has violated a network access policy. In such scenarios, server 100 can optionally notify the user/admin of the network of such violation(s).

At step 926, the user/admin can be presented with an opportunity to modify or update one or more of the network access policies based on the traffic and/or violations observed during blocks 922 and 924. For example, the admin can optionally adjust a network access policy to be less stringent if the frequency of traffic violations exceeds a first threshold level or can optionally adjust a network access policy to be more stringent if the frequency of traffic violations is below a second threshold level different (or less) than the first threshold level. Although the operations of block 926 are shown as occurring after block 924, the operations of block 926 can occur concurrently or in parallel with the operations of block 922 or 924. The operations of blocks 922, 924, and 926 can occur over several days, weeks, months, or other suitable amount of time for the user/admin to gain sufficient confidence or familiarity with the behavior of the client devices being monitored and for the user/admin to determine whether the current state of the network access policies is ready for normal operation. The network access policies can be considered "ready" for normal operation when, for example, server 100 observes no (or minimal) traffic violations over a few weeks or other suitable duration. Once the admin is satisfied with the current state of the network access policies, server 100 can exit the monitoring mode as indicated by step 928. During the monitoring mode, server 100 can be configured to monitor an entire network or can selectively monitor only a portion of a network for a more targeted approach. For example, server 100 might only monitor a subset of all existing network segments within a network during block 910.

After the monitoring mode, server 100 can enter the enforcement mode. Block 912 includes operations that can be performed during the enforcement mode. The enforcement mode can occur concurrently with normal operation of the network. During normal operation (enforcement mode), any client device that violates a corresponding network access policy can be automatically moved to a quarantine segment (see, e.g., step 930). Any device that is moved to such a quarantine segment may be disallowed from communicating with any other network segment. Placing violating client devices within a quarantine segment in this way can thus isolate or contain a potentially compromised client device.

Moving a violating device to a quarantine segment is exemplary. In another embodiment, any client device that violates a corresponding network access policy can be flagged by server 100 (see, e.g., step 932). Flagged client devices can optionally be allowed to stay on the network without being quarantined. The user/admin can, however, be notified whenever a client device is flagged for violating a network access policy. After being notified, the user/admin can then take suitable action on the violating client device. For example, the user/admin can decide to investigate the nature of the violation, choose to update the network access policy based on the investigation results, decide to place the violating client into a quarantine segment, ignore the violation, etc. The network can switch between operating in the monitoring mode and the enforcement mode.

Figure 5:
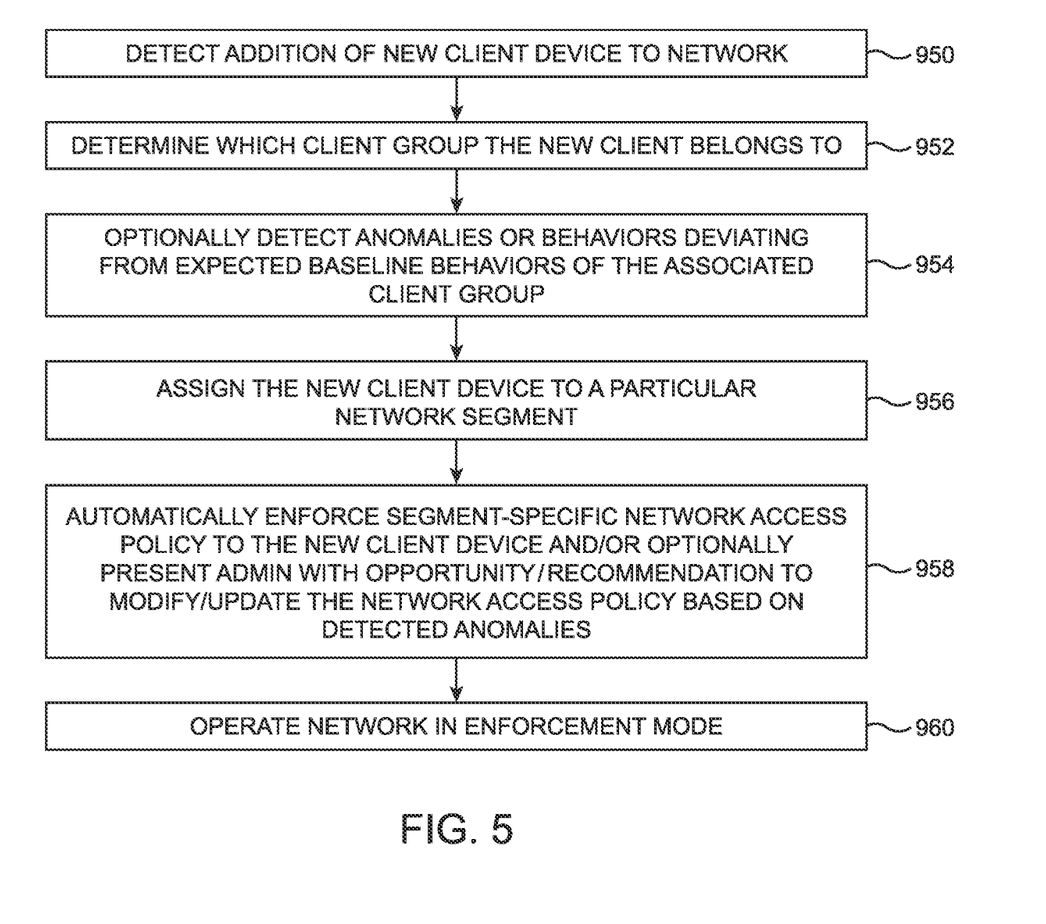
FIG. 5 is flow chart of illustrative steps for applying a network access policy to a newly added client device in accordance with some embodiments.

FIG. 5 is flow chart of illustrative steps for applying a network access policy to a client device that is being newly added to a network. During the operations of block 950, server 100 may detect the addition of one or more new client device to the network. Server 100 may detect when a new device attempts to connect to the network (e.g., to ensure that the device meets security and compliance requirements before granting network access). Server 100 may discover new devices by detecting an address resolution protocol (ARP) request in an Ethernet network, detecting a dynamic host configuration protocol (DHCP) request when a DHCP server is used, scanning open ports on the network, detecting beacon frames in the Wi-Fi network, or performing other device discovery operations (as examples).

During the operations of block 952, server 100 may determine to which client group the newly added client device belongs. Server 100 may determine which group a particular client device belongs based on device characteristics or features such as the device's assigned name or hostname, media access control (MAC) address, Internet Protocol (IP) address, operating system, open ports, manufacturer information, and/or physical location, just to name a few. As an example, server 100 may detect the addition of a new security camera made by a first manufacturer and classify that new security camera as belonging to a camera group associated with the first manufacturer.

During the operations of block 954, server 100 may monitor the newly added client device and optionally detect anomalies or behaviors deviating from expected baseline behaviors of the associated client group. Client devices exhibiting anomalous behavior can be referred to herein as "outlier" client devices. The baseline behavior of a client group may be based on the expected traffic patterns of the client group observed during block 904 (see FIG. 3). Any detected anomalous behavior can be optionally reported to the user/admin of the network.

During the operations of block 956, server 100 can assign the new client device to a particular network segment. Server 100 can make the network segment assignment based on the client group it belongs to and/or based on the traffic or behavioral patterns of the new client device. For example, server 100 can analyze the type and volume of network traffic generated by a new client device to gain insight into its role within the network, how the new client device interacts or behaves with other devices within the network, the protocol the new client device uses to communicate with other devices, domain name system (DNS) queries made by the new client device, the speed (latency) at which the new client device responds to network requests, and/or the resource usage (e.g., by monitoring CPU or memory usage) of the new client device, just to name a few. Continuing with the example from above, the new security camera may be assigned to a camera network segment that includes multiple camera groups associated with a plurality of different manufacturers.

During the operations of block 958, server 100 may automatically enforce a network access policy corresponding to the network segment assigned in block 956 to the new client device. The network access policy can be the auto-derived policy obtained from block 906 of FIG. 3 or can be a modified network access policy obtained after the monitoring mode (see, e.g., operations of block 910 in FIG. 4). During block 958, server 100 can optionally present the user/admin with an opportunity or recommendation to modify/update the network access policy based on any anomalous behavior that might have been observed during block 954. As an example, server 100 might detect that a security camera is transferring significantly more data than normal during block 954, which might be indicative of a high definition camera as opposed to a more basic low definition camera. In such scenarios, server 100 might recommend to the user/admin to update the camera segment network access policy to enforce an additional bandwidth limit on just the high definition camera or on the entire camera network segment. The user/admin may or may not adopt the recommendation from server 100. The user/admin can make changes different from the recommended guidelines to one or more network access policies based on the detected anomalies. If desired, server 100 (with or without input from the user/admin) can generate a modified version of the auto-generated network access policy for the outlier client device to accommodate the anomalous behavior of the outlier client device.

After block 958, the network can be operated in the enforcement mode (see block 960). Details of the enforcement mode are shown and described in connection with block 912 of FIG. 4 and need not be reiterated in detail.

The operations of FIGS. 3-5 are merely illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 6:
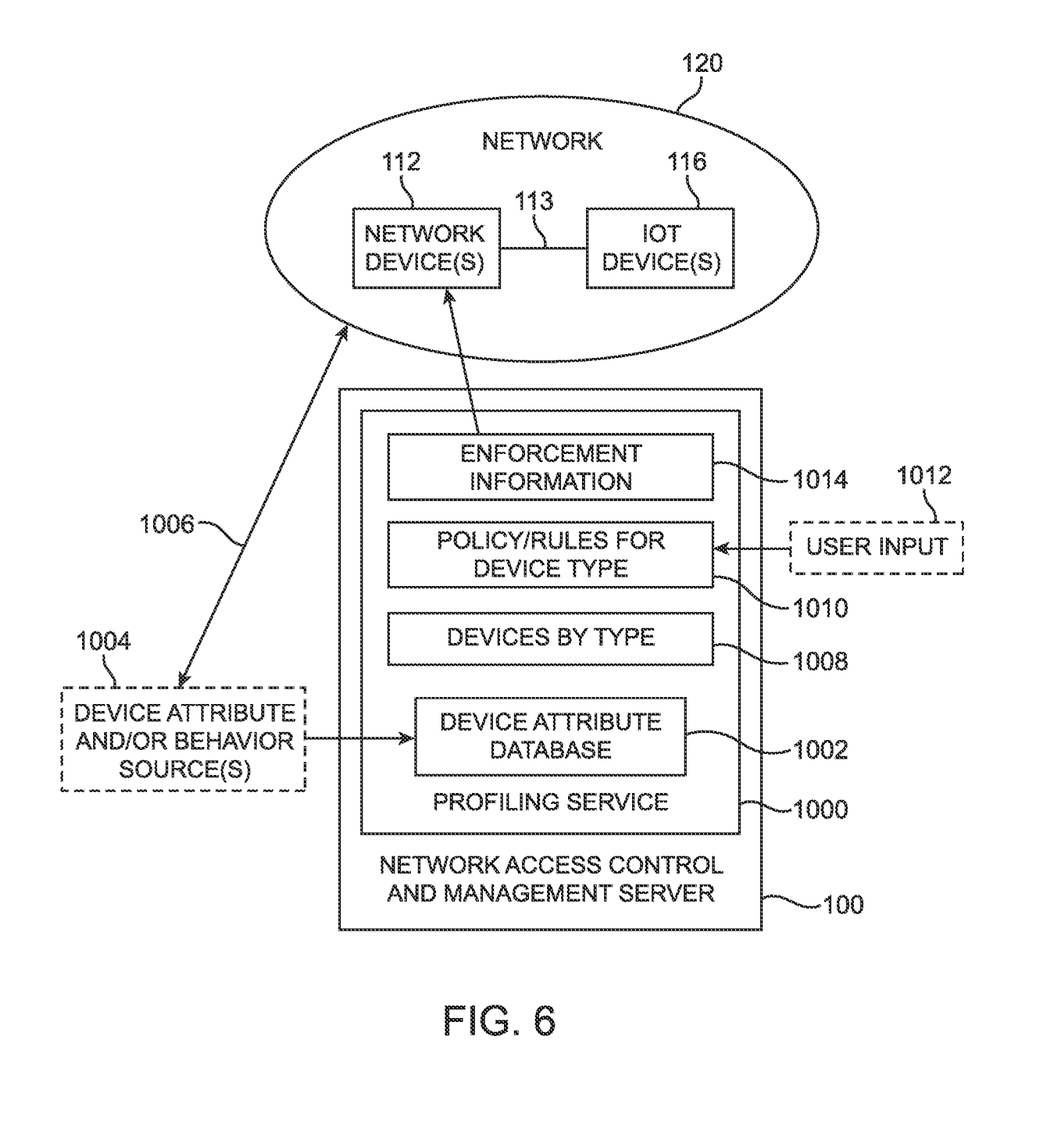
FIG. 6 is a diagram of an illustrative network access control and management server having a profiling service in accordance with some embodiments.

FIG. 6 is a diagram of an illustrative network access and management server 100 that includes a profiling service 1000 that profiles or groups client devices based on their attributes and/or traffic patterns or behavior. As shown in FIG. 6, in connection with profiling service 1000, server 100 may store device attribute database 1002 (e.g., containing storage 800). Server 100 may populate device attribute database 1002 based on sources 1004 of device attribute and/or device behavior. These sources may include supplement servers and/or equipment 124, each of which may obtain network operational information (e.g., network traffic from network devices, configuration data of network devices, operational information of host devices, etc.), may generate network performance metrics data, may analyze the observed information and metrics data to characterize network behavior, and/or may receive user information such as user authentication and identity information. These communications may be exchanged using communication paths 1006 (e.g., paths 136 in FIG. 1). If desired, server 100 may populate database 1002 directly based on user input and/or based on data gathered from communicating with elements of network 120.

Profiling service 1000 may further generate and maintain information 1008 to organize the devices in database 1002 by device type. In illustrative configurations in which profiling service 1000 is specifically for informing and generating network policy, device type information contained within information 1008 may be used to inform network access policy 1010 and the corresponding policy rules for each device type (or generally each group of devices categorized into a network segment as identified by information 1008). Server 100 may generate and arrive at the network policy 1010 automatically based on the device attributes and/or behavior stored at database 1002 (e.g., without further user input). If desired, server 100 may receive user input 1012 (e.g., via a user interface provided at a client device communicatively coupled to server 100 via path 122 in FIG. 1) and use user input 1012 to further define or refine the automatically generated network policy 1010. Server 100 may generate network policy enforcement information 1014 to be distributed to corresponding network devices 112 and/or to be stored and accessible by network devices 112 (e.g., by request via RADIUS). In such a manner, network traffic for host devices such as IoT devices 116 may be processed to enforce the desired network policy.

In other illustrative configuration, profiling server 1000 may generally be a profiling service separate from the network policy generation and/or enforcement services provided by server 100. In these other configurations, profiling service 1000 may manage database 1002 and information 1008 without managing policy and/or enforcement information. Profiling server 1000 may communicate with multiple other services (e.g., including the policy generation and enforcement services) to convey profiling information for consumption (use) by the other services.

The foregoing is merely illustrative and various modifications can be made to the described embodiments. The foregoing embodiments may be implemented individually or in any combination.

What is claimed is:

1. A method of operating a network comprising:
   identifying a plurality of client devices connected to the network;
   categorizing the client devices into respective client groups based on device characteristics of each of the client devices;
   analyzing traffic patterns among the client groups and assigning the client groups to respective network segments based on the traffic patterns; and
   automatically generating a network access policy for at least one of the network segments based on the traffic patterns associated with a portion of the client devices belonging to the at least one of the network segments.

2. The method of claim 1, further comprising:
   operating the network in a monitoring mode using the generated network access policy; and
   during the monitoring mode, detecting traffic violations by checking whether the portion of the client devices belonging to the at least one of the network segments is violating the generated network access policy.

3. The method of claim 2, further comprising:
   allowing at least some of the detected traffic violations to proceed.

4. The method of claim 3, further comprising:
   notifying a user of the network of the detected traffic violations.

5. The method of claim 2, further comprising:
   presenting a user of the network with an opportunity to modify the generated network access policy based on the detected traffic violations to generate a modified network access policy.

6. The method of claim 5, further comprising:
   exiting the monitoring mode when no traffic violations have been detected for a period of time exceeding a threshold duration.

7. The method of claim 6, further comprising:
   in response to exiting the monitoring mode, operating the network in an enforcement mode using the modified network access policy; and
   during the enforcement mode, detecting traffic violations by checking whether the portion of the client devices belonging to the at least one of the network segments is violating the modified network access policy.

8. The method of claim 1, further comprising:
operating the network in an enforcement mode using the generated network access policy; and
during the enforcement mode, detecting traffic violations by checking whether the portion of the client devices belonging to the at least one of the network segments is violating the generated network access policy.

9. The method of claim 8, further comprising:
during the enforcement mode, moving a client device that has violated the generated network access policy to a quarantine segment to prevent the client device from interacting with client devices in other network segments.

10. The method of claim 8, further comprising,
during the enforcement mode, flagging a client device that has violated the generated network access policy;
allowing the flagged client device to continue interacting with other client devices on the network; and
notifying a user of the network of the flagged client device.

11. A method of operating a network comprising:
detecting a new client device connecting to the network;
assigning the new client device to a network segment;
generating a network access policy for the network segment based on baseline behaviors associated with client devices belonging to the network segment; and
determining whether the new client device is violating the network access policy.

12. The method of claim 11, wherein assigning the new client device to the network segment comprises assigning the new client device to the network segment based on expected traffic patterns or behavior of the new client device.

13. The method of claim 11, further comprising:
detecting an anomalous behavior deviating from the expected behavior of the new client device.

14. The method of claim 13, further comprising:
presenting a user of the network with an opportunity to update the network access policy based on the detected anomalous behavior to generate an updated network access policy.

15. The method of claim 14, further comprising:
operating the network in an enforcement mode that checks whether the new client device is violating the updated network access policy.

16. The method of claim 15, further comprising:
during the enforcement mode, moving the new client device that has violated the modified network access policy to a quarantine segment to isolate the new client device from client devices in other network segments of the network.

17. The method of claim 15, further comprising,
during the enforcement mode, flagging the new client device that has violated the modified network access policy;
allowing the new client device to continue interacting with other client devices on the network; and
notifying the user that the new client device has violated the modified network access policy.

18. A method of operating a network comprising:
determining that a client device belongs to a selected client group;
identifying a baseline behavior of the selected client group; and
automatically deriving a network access policy for the client device based on the identified baseline behavior of the selected client group.

19. The method of claim 18, further comprising:
detecting when the client device violates the network access policy; and
in response to detecting that the client device has violated the network access policy, preventing the client device from interacting with other devices on the network by quarantining the client device.

20. The method of claim 18, further comprising:
identifying an outlier client device belonging to the selected client group but exhibiting anomalous behavior that deviates from the baseline behavior of the selected client group; and
generating a modified version of the network access policy for the outlier client device to accommodate the anomalous behavior of the outlier client device.

* * * * *